April 9, 1963 W. K. HORATH 3,084,559
FLOATING, INTEGRATING RATE GYROS
Filed Jan. 26, 1960
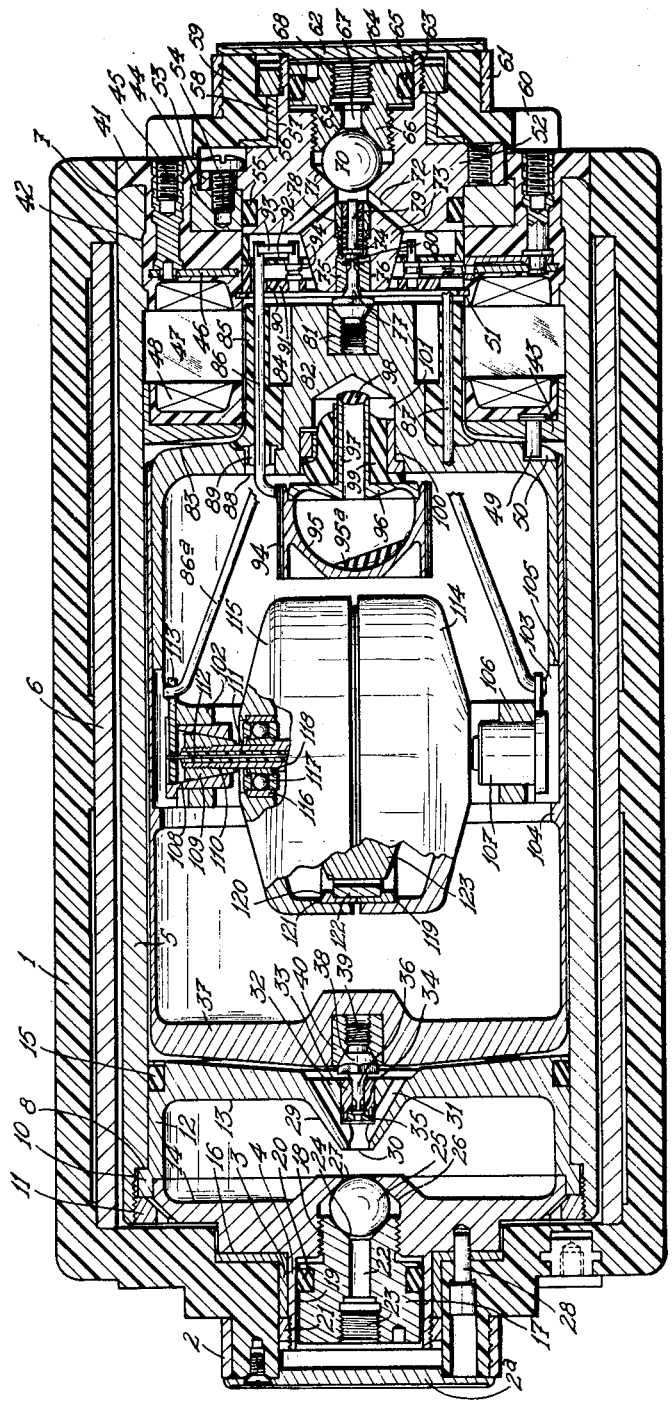

United States Patent Office 3,084,559
Patented Apr. 9, 1963

3,084,559
FLOATING, INTEGRATING RATE GYROS
Werner Karl Horath, Palaiseau, France, assignor to Societe de Fabrication d'Instruments de Mesure (S.F.I.M.), Massy, France
Filed Jan. 26, 1960, Ser. No. 4,641
Claims priority, application France Jan. 28, 1959
9 Claims. (Cl. 74—5)

Floating, integrating rate gyros and apparatus of this type are instruments of most exacting construction, which must be built to the utmost limit of attainable mechanical precision if good results are to be obtained. The trickiest problems raised by this type of construction are those connected with the integral filling of the apparatus by the liquid, the degree of resilient play which must be maintained in order to compensate for the expansions and contractions of the liquid, and lastly the balancing of such aparatus, this balancing ordinarily requiring, in order that it shall be accomplished, numerous assemblings and dismantlings, the result of which is often to spoil the accuracy of such parts as the pivoting members, while also multiplying the number of necessary fillings and drainings.

The chief aim of the invention is to overcome such drawbacks, while at the same time facilitating construction, assembly, filling and balancing of pieces of apparatus of this type.

According to the invention, the outer envelope of the floating and moving body is provided with an inner surface which is as smooth as possible and which is brought, with as constant as possible an intervening air gap, close to the outer surface, likewise very smooth, of the moving body, this outer envelope being provided with communicating channels which surround the bearings of the moving body.

This inner surface of the outer envelope includes, through the use of suitable liners, a continuous wall formed level with the stator of the sensor associated to the moving body, while the outer surface of the moving body likewise includes, again by the use of suitable lining, the surfaces of the rotor of said sensor.

The channels referred to join together to form axial orifices of which one is directly plugged by an obturator, say a ball-valve, while the other forms an orifice which is constantly buried in a bubble-trap. This trap is provided with an orifice which is located opposite the buried orifice and which is likewise axial and plugged by an obturator, for example a second ball-valve.

The obturators not only close up the corresponding orifices in the outer envelope, but also those of perforated plugs which allow connections to be established with the conduits employed to circulate the filling liquid at the time of manufacture, it being sufficient for these plugs to be screwed in after completion of the filling operation in order to obtain simultaneous closure of all the orifices.

An arrangement of this nature ensures that, after the apparatus has been assembled, correct filling is obtained, the bubble trap forming a compensating chamber by process of expansion.

Balancing of the apparatus once the latter has been assembled is achieved by the provision, inside the floating and moving body, of a bowl associated with an electrical heating element, said bowl containing a dead head made of heat-fused material such as an alloy having a low melting point. Thus balancing is very simply accomplished by mounting the apparatus, after measurement of the degree of out-of-balance, on an orienting ring and temporarily connecting up the heating element, this producing fusion of the dead head followed by its coagulation in the required location inside the bowl.

These arrangements enable very great savings to be obtained in the construction of such apparatus, by reducing the duration of the operations referred to, namely filling and balancing.

The description which follows with reference to the accompanying drawing given by way of example only and not in a limiting sense, will give a clear understanding of how the invention may be performed, while at the same time disclosing other useful particularities thereof.

The drawing is a diagrammatic axial section view on an enlarged scale of a floating integrating rate gyro according to the invention.

Referring now to this drawing, the floating integrating rate gyro comprises a protective envelope 1 made of moulded plastic material which, during the moulding process, is provided with inserts that are machined to form a bearing 2 to provide outer location on the support, and a further inner bearing 3 for location in abutment of the nose 4 of the envelope of said floating integrating rate gyro. The envelope 5 is loosely inserted into the metal casing 6 which contains an electrical heating element and a monitoring thermometer element and which is retained, by virtue of its insertion, inside the moulding of the envelope 1. At the opposite end to the bearing 3, the envelope 5 is supported directly by a cylindrical bearing 7 machined into the reinforcement which forms the edge of the envelope 1.

In operation, the heating element 6 is used to warm the whole apparatus to a thermostatically controlled temperature that is above that of the environment in which the apparatus is called upon to function.

The envelope 5 constitutes a sealing enclosure at one end of which is located, upon a shoulder portion 8, the edge 10 of a bowl which is retained in position by a threaded ring 11 screwed into the tapped portion which precedes the shoulder 8. This edge 10 is integral with the lateral walls 12 of said bowl and its bottom 13. It is furthermore slipped over, and welded to, a cover 14 which closes the bowl and forms a separate chamber inside the envelope 5. Any leak of liquid via the joint separating the inner wall of the envelope 5 and the outer surface of the wall 12 is prevented by a plastic seal 15 accommodated in a groove in the wall 12.

On its outer portion, the cover 14 is provided with a bearing 16, which bears against the circular surface of the insert 3, and a cylindrical bearing forming the nose 4 which locates the complete envelope 5 with respect to the insert 2 acting as support. This nose 4 is hollow and accommodates a plug 17, which is screwed into the nose via its threaded end 18 and a corresponding tapped portion, and is suitably located by means of a cylindrical bearing 19 that cooperates with an interposed plastic seal 20 accommodated in a groove provided in the bearing portion of the plug. The nose 4 is fixed in position by a tightening nut 21 bearing against the face of the insert 3. The plug 17 has a passage 22 bored through it which terminates in a tapped portion 23 at one end that is designed to mate with a filler coupling, and at the other in a conical-shaped seat 24 which bears against a ball 25 that acts as a plug. This ball seats in the cone-shaped bottom 26 of the tapped recess in the cover 14 and plugs an aperture 27. A locating dowel 28 is inserted into a constricted perforation in the bottom of the envelope 1 and passes through the bearing 16 before being inserted into the corresponding blind hole in the cover 14. A cap 2a covers the orifice which opens up into the envelope 1 and is secured in position by means of recessed screws.

The bottom 13 of the bowl features a central protuberance 29 provided with an aperture 30 which communicates, via sloping passages 31, with the interior of the envelope 5. These passages pass right through a hollow core 32 into which is driven a socket 33 carrying the pierced jewel 34 acting as a bearing and the jewel 35 acting as a counter-pivot for a journal 36 of the moving body 37 which is inserted into the envelope 5. This socket 33 is calibrated to within a very close tolerance in relation to the body of the journal 36, and only the spindle end of the latter is allowed to cooperate with the jewels.

The journal 36 is provided with a body 38 having a polygon-shaped head, a conical-shaped locating bearing and a threaded nipple 39 at the opposite end of the journal 36, the whole being located and aligned in a further socket 40 of corresponding shape, made of some hard material inserted, during the moulding process, into the light material that forms the envelope of the moving body 37.

At its opposite end, the envelope 5 is provided with an insert 41 made of plastic material, that is anchored within a groove 42 and which internally envelopes an annular portion 43 which separates the space reserved for the moving body and that reserved for the sensor of the moving body movements. This insert carries buried within it a locating metal ring 44 suitably machined over its external faces, terminals 45 for external connection, riveted onto suitably cambered dispatching boards 46, and the cores 47 and coils 48 of the sensor stator. The inner surface of the insert and of the ring 44 forms a cylinder which is flush with the extremities of the cores 47 and which joins up, via a neck-moulding, with the surface of the partition 43. A dowel 49 passes through this partition and is retained in the moulded material by a suitable head. This dowel protrudes outside the partition and cooperates with a notch 50 embodied in the moving body, the purpose of which is to limit angular displacement.

This cylindrical surface features a groove into which is inserted a washer 51 designed to anchor a staggered system of cups which act as supports for the fixed electric current distribution terminals; this washer 51 also serves to anchor various component elements of the moving body as well as restraining cross-stays for the cups, between the washer itself and the face of a rear plug. It is now proposed to describe this assembly.

The rear plug 52 is inserted, via its cylindrical and shouldered body, into the ring 44 against which it is thrust, through the medium of the shoulder which forms a perforated flange 53, by means of screws 54 which pass through these perforations and screw into tapped blind holes in the thrust face of the ring 44. Thus the plug 52 is suitably centered and stopped in the ring 44. A hermetic seat 55 is accommodated in a groove embodied in the cylindrical bearing of the plug and bears against the corresponding bearing surface of the ring.

The outside of the plug 52 likewise comprises a thrust face 56 and a cylindrical bearing 57 which are designed to mate with corresponding surfaces of a machined insert 58 of a support 59 made of insulating moulded material. This annular support has a flange provided with notches 60 which give access to the terminals 45 and further comprises an insert 61 which is machined externally into cylindrical shape, in similar fashion to the insert 2, for cooperation with a supporting member.

The opening into this annular support 59 is likewise closed by means of a cover 62 similar to the cover 2a and secured in the same manner.

The plug 52 is hollow and embodies a cylindrical lodging 63 which receives and guides the cylindrical head of an obturator 64 which is similar to the plug 17. This cylindrical head is provided with a groove which accommodates a seal 65 and which is located above a threaded portion 66. This obturator 64 has a passage 67 drilled through it, terminating at one end in a tapped section 68 similar to the tapped section 23 of the plug 17, and at the other in a conical seat 69 similar to the seat 24. This seat cooperates with a ball 70 which is lodged in the plug 52 and which rests on a conical seat 71 similar to the seat 26, provided at the bottom of said lodging. The opening of the seat 71 is in communication with passages 72 drilled slantwise through the plug 52, about a protuberance 73 in the middle of the plane inner angular face of said plug. This protuberance is traversed by a boring the central portion of which features a tapped section 74. This inside of this boring has driven into it a socket 75 which carries a pierced jewel 76 acting as a bearing for the spindle of a journal 77 similar to the journal 36. The tapped section 74 receives the threaded terminal section of a socket 78 containing a spring-stud 79 the head of which bears a counter-pivot jewel 80, so that the whole system acts as an axial anti-shock arrangement, while the small degree of play in the journals 36 and 77 in the bores of the sockets 33 and 75 acts as a transverse anti-shock feature which precludes any danger of spindle rupture.

The journal 77 is mounted on the end of a conical bearing, having a polygonal head and a threaded tail end, which is screwed into and aligned and located in an insert 81 made of hard metal in the light metal constituting the nose 82 of the moving body 37.

The envelope of the moving body is made up of two distinct component elements of which one forms a deep bowl and the other a lid which is slipped all the way into the bowl. It is with this lid that the nose 82 is integral, and the outer surface of said lid forms a gently rounded face 83 which follows, in substantially parallel fashion, the opposite face of the partition 43. This lid is sealed by being welded against the edge of the bowl 37. The outer surface of this edge forms a cylinder which follows, in parallel fashion and with a constant gap, the inner face of the cylinder which is constituted by the envelope 5. The outer face of the bottom of the bowl 37 likewise follows, in parallel fashion, the outer face of the bottom of the bubble-trap 12.

In order also to insure the desired quality of continuity in the outer surface of the moving body on a level with the sensor, the nose 82 carries the pole pieces 84 of the sensor rotor, and, together with the nose itself, these pole pieces are potted in insulating material 85 in which are likewise buried electrical conductors such as 86 and tubes such as 87 to allow a vacuum to be produced inside the moving body. If required, these conductors can be used to lead electric current into the moving body, and to this end are made to pass through holes 88 in the bottom of the cover, which are provided with insulated bushes 89.

These conductor bars 86 pass through slots 90 in the two terminal-holding sockets 91—92, and are able to pivot together with the moving body 37. The sockets 91 and 92 are provided with a flange which is gripped between the washer 51 and the face of the plug 52. The split ends of the bars 86 protrude into the space comprised between the socket 92 and the plug 52 and are fitted with a strip of gold foil 93 which is cambered and provides for a flexible coupling with the corresponding terminals 94, there being no restoring torque owing to the ductility of the gold. These terminals 94 are slipped through perforations located opposite the two sockets, a central bulging portion being provided to act as a spacer between the sockets and as a connecting element for linking up with the conductors leading to the dispatching board 46.

At least two of these bars 86 serve as feeders for a heating element 94 which surrounds a cup 95 placed inside the moving body. This cup is attached to a shaped lid 96, held in position by a hollow end-piece 97 that can be plugged by means of a weld-spot 98. This end-piece is part of a mass of material 99 used as an insert, for angular setting, into a shouldered and castellated socket 100, this socket being driven into a suitable lodging 101 in the nose 82. The cup 95 is of spherical shape, and a dead head 95a is introduced into it to allow the complete moving body of the apparatus to be balanced; this dead head is made of an alloy which melts easily under the action of the heating element 94, once the latter is connected up, and which is chosen so that it has strong adhesive properties to the wall of the cup once it has cooled and solidified.

Further bars 86 serve to feed the stator of the gyroscope rotor inside the moving body.

The rotor of the gyro is supported in a gimbal 102 which is surrounded by a ring 103 gripped between an inner circular reinforcement 104 of the moving body 37 and the face 105 of the latter welded cover. This ring is surmounted by spacers 106 which act as chords for the annular portion, and these spacers serve as supports for pieces 107 which themselves support the rotor spindle. The pieces 107 are driven into the spacers and each one comprises an internal conical bearing 108 fitted with a corresponding conical core-piece 109 into which is screwed the ferrule 110 of the rotor spindle. Such an arrangement ensures rigorous location of the spindle.

The spindle 110 is itself hollow and is fitted inside with an insulating liner 111 through which passes the power supplying wire 112 for the windings of the stator which constitutes the field magnet of the gyro rotor. The ends of the conductor 112 are connected, via strips 113, to extensions 86a of the appropriate busbars 86.

The gyro rotor itself consists of an assembly of two non-magnetic steel domes 114 and 115 which provide the non-magnetic casing, into which are driven the outer races 116 of ball-bearings 117 whose inner races 118 are supported, via a suitable shoulder, on a central reinforcement provided on the fixed spindle 110. The raceways of the inner races 118 are conical and flare out from the centre of the rotor, so that tightening together of the two domes 114 and 115 allows negative play to be taken up as required.

The domes are assembled together by drive fitting over an inner non-magnetic ring 119 consisting of two superimposed sections which bear, via marginal reinforcements 120, against an interior shoulder 121 in each dome, these shoulders being lapped-in to size to allow correct tightening of the ball-bearings.

The two sections of this ring 119 are themselves driving fits over an inner ring 122 which is thus itself securely retained. This ring 122 is capable of being magnetized and is located opposite the pole pieces 123 of the stator which is integral with the fixed spindle 110. The whole constitutes a hysteresis motor.

Furthermore, the coefficients of expansion of the rings 119 and 122 and of the domes 114 and 115 are so chosen as to ensure that the required compensation is effected to enable the prestressing in the ball-bearings to be kept within acceptable limits during the variations in temperature which occur when the unit is idle and when it is in operation.

It will easily be appreciated that such a unit can be fully assembled to satisfy requirements more exacting than those permitted by even the ultimate in machining accuracy—using pivots, counter-pivots and journals perfectly matched-off in pairs by judicious selection—and that the complete unit then no longer needs to be dismantled for balancing purposes; for indeed this counterbalancing operation is actually carried out on the counterbalancing machine itself by the process of liquefying the dead head 95a inside the bowl 95, the necessary heat being provided by provisionally connecting up the heating element 94. The unit is then inclined into the position required to allow correct positioning of the dead head in the bowl, and the element 94 is disconnected. This causes the dead head to solidify and adhere to the bowl 95 in the required position.

The filling operation can then be undertaken, and to this end the plugs 17 and 64 are loosened. Now, while the unit remains fully sealed, it is connected up, via the tapped orifices 23 and 68, to a circuit through which is flowed a large quantity of the filling liquid. This circuit naturally includes degassing and bubble-removing apparatus. The regularity of the gaps existing between the envelope 5 and its annexes and between the moving body 37 and its annexes allows filling to be effected without bubbles in a short space of time. It should be noted, however, that this circulation of liquid provides for the presence, in the bubble-trap, above the orifice 30, which is constantly submerged, of a gas bubble of relatively large size.

After the prescribed length of time has elapsed, the plugs 17 and 64 are tightened home once more, this resulting in the balls 25 and 70 being gripped between their bearing surfaces, which in turn cuts off all communication inwards and outwards.

Regardless of the configuration which is imposed upon the unit in operation, the orifice 30 remains submerged at all times and consequently prevents inadvertent penetration of any part of the bubble into the damping space situated between the envelope 5 and the moving body 37.

Moreover, by virtue of its compressibility, the trapped bubble absorbs the volumetric variations which take place in the liquid used to float the moving body and to damp its movements, particularly as the result of the temperature differential created when the unit, previously idle, is brought to its substantially constant, higher working temperature under the action of the heating element 6 which is suitably thermostat-controlled.

It will also easily be seen that the counterbalancing operations referred to above could be carried out after filling has been completed. Similarly, the filling operation itself could be performed prior to a zeroing of the blades 93 which, notwithstanding their small degree of resilience, nevertheless cannot be said to engender no restoring couple whatsoever. This zeroing can be accomplished by rotation of the plug 52, even after filling has been carried out.

It is to be clearly understood that modifications may be made to the embodiments described hereinabove, without departing from the scope of the invention. As an example, plugging of the orifices may be carried out using means other than the balls described hereinbefore.

What I claim is:

1. In a floating integrating rate-gyro system, in combination, an envelope having an internal chamber and including oppositely disposed wall elements, a floating moving gyroscopic fluid tight body disposed inside the internal chamber of said envelope, one pair of aligned journals mounted on said body, corresponding bearings mounted in the oppositely disposed wall elements of said envelope, a detecting device for detecting relative movements between said envelope and said body, at least one pair of obturating devices including external filling-couplings in said envelope for retaining a flotation liquid filling a space defined between said envelope and said body, a bubble-trap interposed between one of said obturators and said internal chamber, said bubble-trap comprising a constantly immersed communication between it and said internal chamber, a counterbalancing device internally disposed inside said body, comprising a dead head, and means accessible from outside said envelope for placing said dead head in balancing position.

2. In a floating integrating rate-gyro system, in combination, an envelope having an internal chamber and including oppositely disposed wall elements, a floating moving gyroscopic fluid tight body disposed inside the internal chamber of said envelope, one pair of aligned journals mounted on said body, corresponding bearings mounted in the oppositely disposed wall elements of said envelope, a detecting device for detecting relative movements between said envelope and said body, at least one pair of obturating devices including external filling-couplings in said envelope for retaining a flotation liquid filling a space defined between said envelope and said body, a bubble-trap interposed between one of said obturators and said internal chamber, said bubble-trap comprising a constantly immersed communication between it and said internal chamber, a counterbalancing device internally disposed inside said body, comprising a hollow dome attached to said body, an electric heating element surrounding said dome, a dead head disposed inside said dome, said dead head being of a fusible material providing adherence with said dome when solidified, melting under the action of said heating element, positioned when liquid, and secured to said dome by subsequent solidification in a convenient position, and electrical connecting means extending through said body and comprising torsionless shackles and external terminals on said envelope.

3. In a floating integrating rate-gyro system, in combination, an envelope having an internal chamber and including internal wall elements which are smooth surfaced, a floating movable gyroscopic fluid tight body including external wall elements which are smooth surfaced, said body being disposed inside said internal chamber of said envelope, said internal and external wall elements being spaced at a substantially constant distance, a detecting device for detecting the relative movements between said envelope and said body, at least one pair of obturating devices including external filling-couplings in said envelope for retaining a flotation liquid filling a space defined between said envelope and said body, a bubble-trap interposed between one of said obturators and said internal chamber, said bubble-trap comprising a constantly immersed communication between it and said internal chamber, a counterbalancing device internally disposed inside said body, comprising a dead head, and means accessible from outside said envelope for placing said dead head in balancing position.

4. In a floating integrating rate-gyro system, in combination, an envelope having an internal chamber and including internal wall elements which are smooth surfaced, a detecting device including a rotor and stator, a plastic non-magnetic material housing the stator and forming a unit with a smooth surface against the smooth surfaces of said wall elements, said rotor constituted by a floating movable gyroscopic fluid-tight smooth surface body inside the internal chamber of said envelope and attached to said body, a plastic non-magnetic material housing said rotor and forming a second unit with a smooth surface against the smooth surface of said body, at least one pair of obturating devices including external filling-couplings provided in the wall elements of said envelope for retaining a flotation liquid filling a space defined between the internal surface of said envelope and the external surface of said body, a bubble-trap interposed between one of said obturators and said internal chamber, said bubble-trap being provided with a constantly immersed communication between it and said internal chamber, a counterbalancing device internally disposed inside said body, comprising a dead head, and means accessible from outside said envelope for placing said dead head in balancing position.

5. In a floating integrating rate-gyro system, as claimed in claim 1, a wall element of said body having a threaded bore and a tapered bearing for each said journal, and a screw and tapered part cooperating with each said bore and bearing to connect each said journal to said body.

6. In a floating integrating rate-gyro system as claimed in claim 1, a floating body constituted by a hollow container of two parts in fluid-tight relation, internal supporting means on one of said parts, a stationary shaft, tapered end-attachements on said supporting means centering said shaft, ball bearings yieldingly applied on said shaft, a stator element mounted on said shaft, electric conductors axially disposed in said shaft, electric conducting means connected to said conductors through one of said parts, electric terminals mounted on said envelope, torsionless shakles operatively associated with said electric terminals and connected to said conducting means, and a rotor mounted on said ball bearings and disposed around said stator element, said stator element constituting the field of the rotor, said rotor comprising a magnatizable ring facing said stator.

7. In a floating integrating rate-gyro system, in combination, an envelope, a plug, filling coupling means mounted in fluid-tight relation at an end of said envelope and operatively associated with said plug, a central core, said plug being provided with inclined radially disposed perforations, disposed around said central core, extending from a bore provided in said plug, obturating means in said bore, a bearing in said core, a bubble trap in fluid-tight relation at the other end of said envelope, a second plug, a filling coupling in said trap and operatively associated with said second plug, said trap being provided with inclined perforations extending from a single bore provided in a bossing included by said trap, a second central core including a second bearing and opening inside said envelope, said slanted perforations being disposed around said second core, a floating moving gyroscopic fluid-tight body disposed in said envelope, a pair of aligned journals mounted on said body cooperating with said bearings, a detecting device for detecting the relative movements between said envelope and said body, a counterbalancing device internally disposed inside said body, comprising a dead head, and means accessible from outside said envelope for placing said dead head in balancing position.

8. In a floating integrating rate-gyro system as claimed in claim 6 said rotor further comprising a pair of linings constituted by non-magnetic expansion compensating material on said ring and each including a shoulder on said ring, and a pair of bell-shaped members of non-magnetic material on each of said linings and each including shoulders on said linings.

9. In a floating integrating rate-gyro system, in combination, an envelope, a plug, filling coupling means operatively associated with said plug, said plug being pivotally mounted in fluidtight relation at an end of said envelope, said plug being provided with inclined radially disposed perforations, a central core in said envelope, said perforations being disposed around said central core, core receiving means in said envelope accommodating said core, a bearing in said core and coaxially disposed with respect to said plug, electrical terminals adjacent said plug, a bubble trap at the other end of said envelope, a second bearing, a floating moving gyroscopic fluid-tight body inside said envelope, a pair of aligned journals on said body cooperating with said bearings, a counterbalancing device inside said body and comprising a hollow dome and being attached to said body, an electric heating element surrounding said dome, a dead head disposed inside said dome, said dead head being of a fusible material providing adherence with said dome when solidified, melting under the action of said heating element, positioned when liquid and secured to said dome by subsequent solidification, and electrical connecting means extending through said body and comprising first torsionless shackles, electrical couplings between said shackles and said terminals, an electric gyroscope mounted inside said body, electric conducting means for said electric gyroscope extending through said body, second torsionless shackles and second electrical couplings connected between said second torsionless shackles and said terminals, electric detecting means including a stator mounted on said envelope and further including a rotor mounted on said body, third torsionless shackles, third electrical conducting means between said rotor and third torsionless shackles, third electrical couplings between said third shackles and corresponding of said terminals, and means supporting all of said terminals and electrical coupling means for rotation with said plug for zeroing the residual torque of said shackles.

References Cited in the file of this patent

UNITED STATES PATENTS

| | | |
|---|---|---|
| 2,720,602 | Dolude | Oct. 11, 1955 |
| 2,855,782 | Grohe | Oct. 14, 1958 |
| 2,859,625 | Bonnell | Nov. 11, 1958 |
| 2,859,626 | Maze | Nov. 11, 1958 |